United States Patent [19]
Doane

[11] Patent Number: 5,457,490
[45] Date of Patent: Oct. 10, 1995

[54] DEVICE AND METHOD FOR ACQUIRING SUBSTANTIALLY CENTERED IMAGES OF MOVING ITEMS

[75] Inventor: Dennis L. Doane, Dallas, Tex.

[73] Assignee: Texas Instruments Incorporated, Dallas, Tex.

[21] Appl. No.: 235,034

[22] Filed: Apr. 28, 1994

[51] Int. Cl.$^6$ .................................................... H04N 7/18
[52] U.S. Cl. ................................................ 348/95; 348/132
[58] Field of Search .............................. 348/94, 95, 132, 348/142, 87, 88, 91, 92, 131, 127; 382/8; 209/939

[56] References Cited

U.S. PATENT DOCUMENTS

| | | | |
|---|---|---|---|
| 4,305,658 | 12/1981 | Yoshida | 348/132 |
| 4,794,453 | 12/1988 | Gnuechtel et al. | 348/132 |
| 4,885,784 | 12/1989 | Miyagawa et al. | 382/8 |
| 4,896,211 | 1/1990 | Hunt et al. | 348/132 |
| 5,243,184 | 9/1993 | Fukuchi et al. | 348/127 |

Primary Examiner—Howard W. Britton
Assistant Examiner—A. Au
Attorney, Agent, or Firm—W. James Brady, III; Richard L. Donaldson

[57] ABSTRACT

A device 12 acquires substantially centered images of moving items. A strobe (36) illuminates an item (16) while a camera 28 having a view (29) with a view center (39) acquires an image of that item (16). A position sensor (38) generates an indication signal that indicates when an item (16) is substantially a predetermined distance (D) from the view (29), and an image-data memory (31) stores data representing each image. A processor (24) executes a program for waiting a delay from each indication signal and then instructing the strobe (36) to fire, the camera (28) to acquire an image, and the image-data memory (31) to store the image. The processor (24) then determines an offset value representing the offset of the image from the view center (39), updates an average offset value using the offset value, and updates the delay using the updated average offset value. A program memory (20) stores the program, and a working memory (20) stores the offset value, the delay, and the average offset value.

20 Claims, 3 Drawing Sheets

1

DEVICE AND METHOD FOR ACQUIRING SUBSTANTIALLY CENTERED IMAGES OF MOVING ITEMS

CROSS-REFERENCE TO RELATED APPLICATIONS

This application is related to U.S. application Ser. No. 08/269,293 filed Jun. 30, 1994 by Dennis Lee Doane and Rajiv Roy and entitled "Apparatus and Method For identifying Defective Objects", pending.

TECHNICAL FIELD OF THE INVENTION

The present invention relates generally to electronic devices and more specifically to a device for acquiring substantially centered images of moving items.

BACKGROUND OF THE INVENTION

It is often desirable to visually inspect items, such as beverage cans, as they speed along a conveyor belt toward processing equipment. Automatic inspection systems typically use a stationary camera to acquire an image of each item and a processor to analyze the image for defects. Today's processing equipment may require the conveyor to move the items at speeds at or above 1800 items per minute. If a constant light source illuminates the items, the images are often blurred and thus unsuitable for the processor to inspect. That is, the image-acquiring speed of the camera is often insufficient to acquire sharp images in ambient light.

In high-speed visual inspection systems, the processor fires a strobe to briefly illuminate the item while it is within the camera's field of view. Such brief illumination, typically in the order of 50 microseconds, enables the camera to acquire an image sharp enough for inspection.

For controlling the timing of the strobe firing, a position sensor generates a signal as each item is a predetermined distance from the camera's field of view. After each signal, a controller waits for a "delay time" and then fires the strobe. In some inspection systems, the delay time is either manually calibrated or is set equal to the quotient of the predetermined distance divided by the expected conveyor speed. In other systems, a speed sensor measures the conveyor speed, and a processor calculates the delay equal to the quotient of the predetermined distance divided by a measured conveyor speed.

SUMMARY OF THE INVENTION

One aspect of the present invention is a device for acquiring substantially centered images of moving items. A strobe illuminates an item while a camera acquires an image of that item. A position sensor generates an indication signal that indicates when an item is substantially a predetermined distance from the view of the camera, and an image-data memory stores data representing each image. A processor waits a delay after receiving each indication signal before activating the strobe, the camera, and the image-data memory. The processor then calculates an offset value representing the offset of the image from the view, updates an average offset value using the offset value, and updates the delay using the updated average offset value.

A technical advantage provided by one aspect of the present invention is a closed-loop calculation of the strobe delay. A further advantage provided by another aspect of the invention is calculating the closed-loop strobe delay quickly enough for implementation of the closed-loop technique within high-speed visual inspection devices.

DETAILED DESCRIPTION OF THE INVENTION

Figure 1:
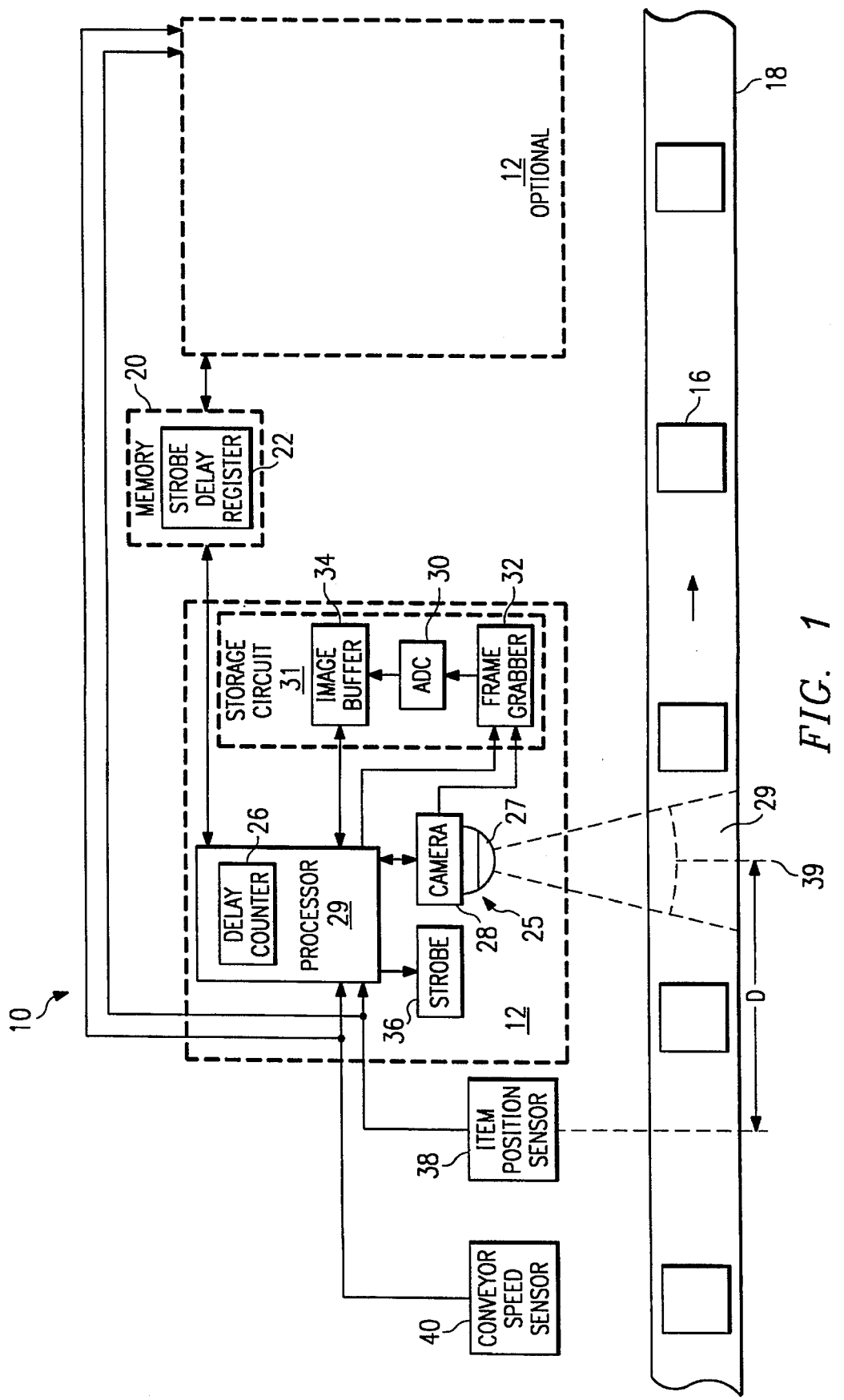
FIG. 1 is a block diagram of a visual inspection system that uses closed-loop techniques for calculating a strobe delay.
Figure 2:
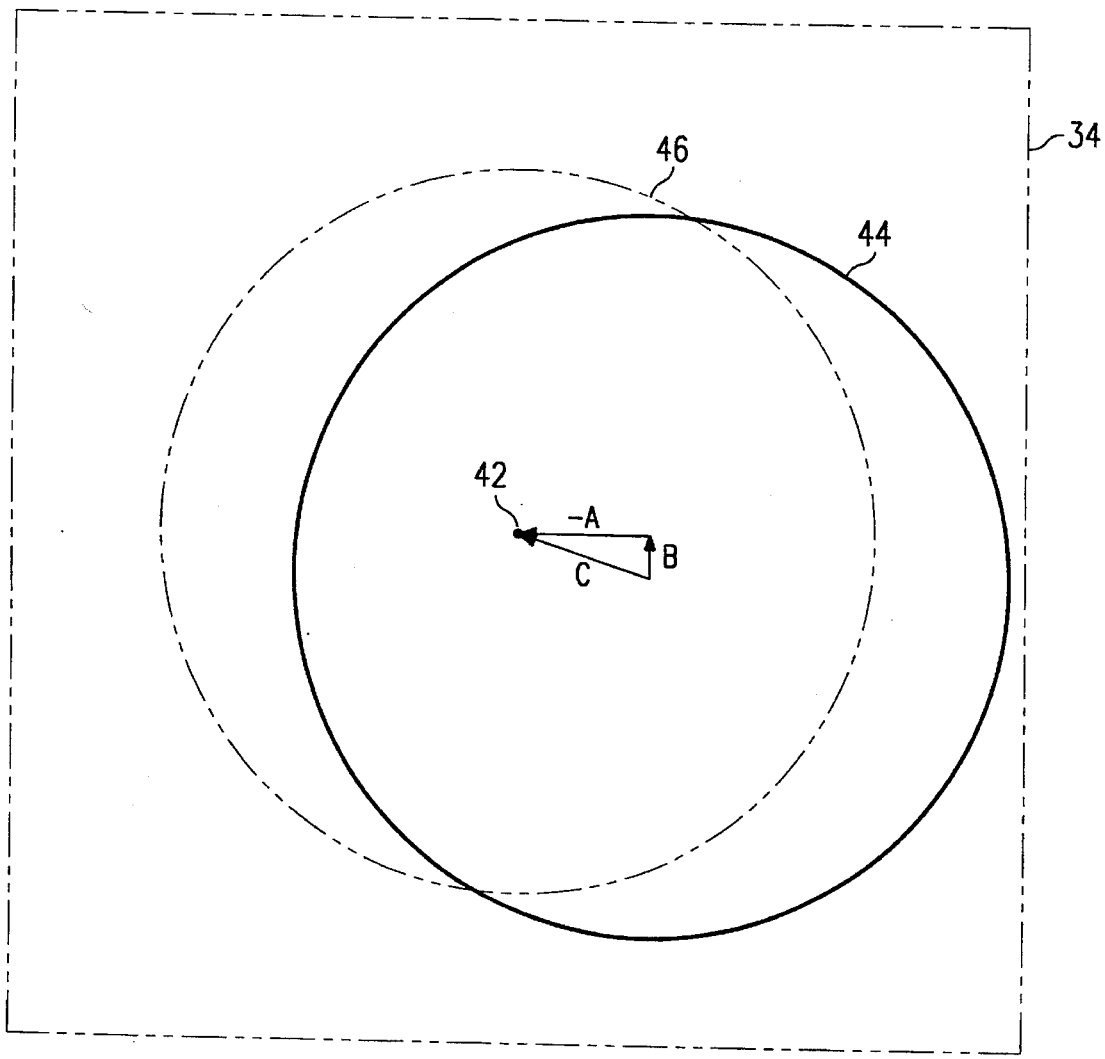
FIG. 2 illustrates the offset between an acquired image and the view center of the camera shown in FIG. 1.
Figure 3:
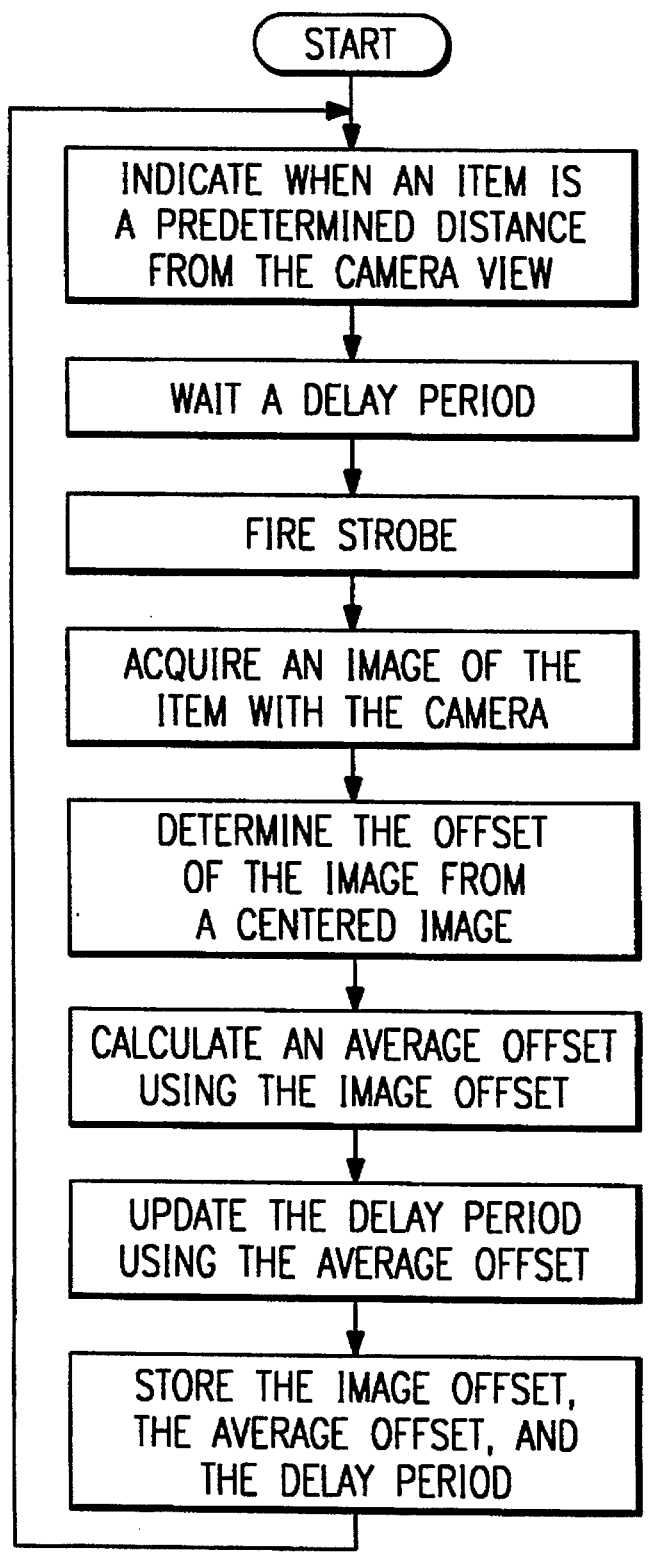
FIG. 3 is a flow diagram of operations performed by the inspection system of FIG. 1.

The preferred embodiment of the present invention and its advantages are best understood by referring to FIGS. 1–3 of the drawings, like numerals being used for like and corresponding parts of the various drawings.

FIG. 1 is a block diagram of an inspection system 10 constructed in accordance with the present invention. System 10 includes an inspection unit 12 for visually inspecting items, such as beverage cans 16, traveling on a conveyor belt 18 in the direction of the arrow. Inspection circuit 12 acquires an image of the interior of a can 16, converts the image to digital data, and analyzes the image data for defects. If inspection unit 12 identifies a defective can 16, it signals a reject mechanism (not shown) to remove the defective can 16 from conveyor 18 before the defective can 16 is delivered to the processing equipment (not shown). As explained below, unit 12 implements a feedback loop to acquire an image when a corresponding can 16 is fully within its imaging view 29, and preferably when the can 16 is substantially centered within imaging view 29.

As indicated in FIG. 1, system 10 may have multiple inspection units 12, which are similar in structure and operation. The use of multiple units 12 increases the speed at which system 10 can inspect cans 16. For example, with two units 12, each inspects every other can 16. However, for purposes of explanation, the following description is in terms of a single inspection unit 12.

System 10 also includes a memory 20 having a strobe delay register 22. Unit 12, as well as any optional units 12, have access to both memory 20 and strobe delay register 22.

Inspection unit 12 includes a processor 24 having a strobe delay counter 26. Processor 24 may be an instruction-based processor, a controller, a logic circuit, or any other device that performs the calculations and operations described below. A camera 28, which is controlled by processor 24, acquires an image of a can 16 when it is within view 29 of camera 28. Typically, camera 28 includes a charge-coupled device (CCD), which transforms the image into a plurality of analog pixels. These analog pixels are stored as the acquired image by a storage circuit 31. Camera 28 may also include a fish-eye lens 25 for transforming the camera's view of the inside wall of can 16 into a two-dimensional view. A neutral density filter 27 may be placed over fish-eye lens 25 to accommodate for expected brightness differences among portions of the interior of each can 16.

Storage circuit 31, which acts as a memory for image data, includes a frame grabber 32, which in response to processor 24, couples the video frame containing the image from camera 28 to an analog-to-digital converter (ADC) 30. ADC 30 converts the analog pixels into digital pixel data. This pixel data is stored in an image buffer 34 for use by processor 24 as it performs its inspection of the can corresponding to the image.

To enable camera 28 to acquire a sharp image of a fast-moving can 16, processor 24 fires a strobe 36 to illuminate the can 16 for approximately 50 µs. This brief illumination "freezes" the motion of the can 16 and thus allows camera 28 to acquire a "frozen" image. Because a can 16 is substantially centered within view 29 only briefly, processor 24 has only a short time window in which to fire strobe 36. An item sensor 38 signals processor 24 when the can 16 is a predetermined distance D from the center of view 29. When processor 24 receives this signal, it loads counter 26 with the contents of strobe delay register 22. Counter 26 begins counting down to zero to implement the strobe delay. When counter 26 reaches zero, processor 24 fires strobe 36. Although distance D is measured to center 39 of view 29, it may be measured to any point within view 29.

To reduce or eliminate the acquisition of unsuitable images, one aspect of the invention is the calculation of a strobe delay time.

A feedback loop implemented by unit 12 maintains proper timing of the strobe firing by determining the offset of an image from a center position and using this offset to adjust the strobe delay so as to reduce or eliminate the offset of the next image. Thus, the feedback loop, unlike an open loop, accounts for drift in certain parameters of system 10. For example, the position of the item sensor 38 or camera 28 may shift, or different types of cans 16, such as cans with a noncylindrical shape, may trigger item sensor 38 at different distances from the center 39 of view 29. Such shifts or trigger variations may warrant an adjustment to the strobe delay. To accommodate for these errors, prior inspection systems may require an operator to manually recalibrate the strobe delay, whereas for device 10, the feedback loop automatically recalibrates the strobe delay.

Because the feedback loop is a closed loop, it has no start or end points. However, for discussion purposes, the loop begins at camera 28 and continues to storage circuit 31, processor 24, strobe 36, and back to camera 28. Strobe 36 and camera 28 are coupled by the light from strobe 36 that is reflected from a can 16 to generate the image in camera 28. How the loop performs its centering function is described below.

FIG. 2 illustrates an image 44 stored in buffer 34 and having an offset C from a center position 46, which has a center 42. Offset C results from the corresponding can 16 being offset from center 39 of view 29 when processor 24 fired strobe 36. If the can 16 had been centered within view 29, image 44 would be aligned with center position 46.

Offset C has a component A, which is substantially parallel to the direction of motion of cans 16, and a component B, which is substantially perpendicular to the direction of motion. The negative value shown for A indicates that the can 16 traveled beyond center 39 before processor 24 fired strobe 36; thus, the strobe delay is too long, and should be shortened to reduce subsequent offsets A to zero. A positive value of A would indicate that the strobe delay is too short and should be lengthened to reduce subsequent offsets A to zero.

Because component B is perpendicular to the direction of motion, it is independent of the strobe delay. That is, adjustment of the strobe delay has little or no effect on component B. As long as the magnitude of component B is not large enough to cause a portion of the image to fall outside of view 29, component B will not cause an error in the inspection of the can 16. However, if processor 24 detects a predetermined number of images having B components with magnitudes that are too large, it may sound an alarm indicating a problem with the equipment that places cans 16 on conveyor 18.

FIG. 3 is a flow diagram of the general operations performed by processor 24 to implement the feedback loop. In operation, processor 24 implements the feedback loop, which adjusts the strobe delay after the acquisition of each image in an attempt to maintain subsequent offsets A at zero. Processor 24 implements the feedback loop fast enough such that system 10 can inspect cans 16 at speeds up to and beyond approximately 1800 cans per second.

Processor 24 maintains in memory 20 an average offset A calculated over a predetermined number N of the most recently acquired images. In this embodiment, N= 100, although the value of N may vary. However, N should be large enough to prevent an occasional abnormally positioned can 16 (such as a fallen can 16) from corrupting the strobe delay.

Until system 10 processes N cans 16, processor 24 implements an initial strobe delay that is either stored in memory 20 before system 10 begins operation or is calculated by dividing the predetermined distance D by the speed of conveyor 18 as provided by speed sensor 40. Thereafter and until system 10 is powered down, processor 24 calculates the strobe delay via the feedback loop.

To calculate the average offset $A_{avg}$, processor 24 also stores in memory 20 the offsets $A_i$, i=0 to N−1, for the N most recent images. When a new image is acquired, processor 24 stores the corresponding offset $A_0$ in memory 20 and deletes the oldest offset $A_N$. Processor 24 uses these N stored offsets $A_0-A_{N-1}$ to update the average offset $A_{avg}$ after each image is acquired.

Specifically, during each cycle of the feedback loop, processor 24 receives a signal from item sensor 38. Processor 24 uses counter 26 as described above to wait the amount of time indicated by the strobe delay, instructs camera 28 to dump any dark-current it may have accumulated, and fires strobe 36. Processor 24 then instructs frame grabber 32 to couple the next full frame of video from camera 28 to ADC 30 and image buffer 34. This video frame contains the image of the can 16 illuminated by strobe 36. Once the image is stored in buffer 34, processor 24 determines and stores in memory 20 the corresponding or most recent offset $A_0$. Processor 24 may make this determination using edge detection techniques or other suitable techniques or algorithms. Furthermore, processor 24 may determine offset C and derive offset A therefrom, or may determine offset A directly.

Processor 24 next multiplies the average offset by N, subtracts the oldest offset, now $A_N$, and adds the newest offset $A_0$ to the difference. Processor 24 then divides this sum by N and stores the quotient as the updated version of the average offset. This updating of the average offset is shown by the following equation:

$$\frac{(A_{avg} \times N - A_N + A_0)}{N} = A_{updated\ avg} \quad (1)$$

Processor 24 then calculates an offset strobe delay, which is the quotient of the updated average offset $A_{updated\ avg}$ divided by the speed of conveyor 18. The offset strobe delay is the amount that the strobe delay should be shortened or lengthened to center subsequent images within view 29 in a direction parallel to the direction of movement of cans 16. A value of the speed may be initially stored in memory 20, or processor 24 may acquire the actual speed from sensor 40. However, the feedback loop provides an accurate offset strobe delay regardless of whether the stored value or the actual speed is used.

Processor 24 updates the strobe delay by adding to it the offset strobe delay and stores the updated strobe delay in strobe delay register 22. Any additional inspection units 12 update in like fashion the strobe delay contained in strobe delay register 22; thus, each inspection unit 12 uses the most current version of the strobe delay. Additionally, the average offset $A_{avg}$ and the predetermined number N of the most recent offsets $A_0$–$A_{N-1}$ are stored in memory 20 for central access by all inspection units 12.

By using feedback to update the strobe delay, inspection unit 12 fires strobe 36 such that the images may be consistently positioned within a few pixels in the direction of movement from the center 42 of buffer 34. Dynamic calibration of the strobe delay using feedback is typically more accurate than manual calibration techniques. Furthermore, the feedback loop will self-calibrate the strobe delay when a different item is processed via conveyor belt 18; no manual calibration is required between runs of different items. Although the present invention and its advantages have been described in detail, it should be understood that various changes, substitutions and alterations can be made therein without departing from the spirit and scope of the invention as defined by the appended claims.

What is claimed is:

1. A device for acquiring substantially centered images of items that are moving at a speed and in a direction, comprising:

a camera for acquiring each image;

a strobe for illuminating each item while said camera is acquiring the image of that item;

a position sensor for generating an indication signal that indicates when each item is substantially a predetermined distance from the view of said camera;

an image-data memory for receiving and storing data representing each image; and a processor for waiting a delay after receiving each said indication signal before activating said strobe, said camera, and said image-data memory, for calculating an offset value representing the offset of said image from said view, for updating an average offset value using said offset value, and for updating said delay using said updated average offset value.

2. The device of claim 1 further comprising:

a speed sensor for providing said speed to said processor;

wherein said processor initially generates said delay equal to the quotient of said predetermined distance divided by said speed.

3. The device of claim 1 further comprising a program memory for storing instructions wherein said processor executes said instructions.

4. The device of claim 1 wherein a program memory stores a speed value approximately equal to said speed, and wherein said processor generates an offset delay equal to, the quotient of said updated average offset value divided by said speed value and adds said offset delay to said delay to update said delay.

5. The device of claim 1 further comprising:

a speed sensor for providing said speed to said processor;

wherein said processor generates an offset delay equal to the quotient of said updated average offset value divided by said speed and adds said offset delay to said delay to update said delay.

6. The device of claim 1 wherein said processor determines said offset in substantially said direction.

7. The device of claim 1 wherein said processor calculates said average offset value over a consecutive number of said images and updates said average offset value by generating a product of said average offset value and said number, subtracting from said product the oldest offset to generate a first value, generating the sum of said first value and said offset value, generating a quotient of said sum divided by said number, and setting said average offset value equal to said quotient.

8. The device of claim 1 wherein said image data memory comprises:

a buffer for storing said data representing each image; and a frame grabber for coupling said data from said camera to said buffer.

9. An inspection system for acquiring substantially centered images of a plurality of containers placed on a conveyor belt moving at a speed and in a direction, comprising:

a camera for acquiring said images;

a strobe for illuminating each container while said camera is acquiring an image of that container;

a speed sensor for measuring said speed;

a position sensor for generating an indication signal that indicates when each container is substantially a predetermined distance from the view of said camera;

a storage circuit for receiving and storing data representing each image; and a processor for waiting a delay after receiving each said indication signal before activating said strobe, said camera, and said storage circuit, for calculating an offset value representing the offset of said image from said view, for updating with said offset value an average offset value taken over a number of images, for generating an offset delay value equal to said updated average offset value divided by said speed, and adding said offset delay value to said delay.

10. The system of claim 9 wherein said processor determines said offset in substantially said direction.

11. The system of claim 9 wherein said processor updates said average offset value by generating a product of said average offset value and said number, subtracting from said product the oldest offset to generate a first value, generating the sum of said first value and said offset value, generating the quotient of the sum divided by said number, and setting said average offset value equal to said quotient.

12. The system of claim 9 further comprising multiple cameras each for acquiring some of said images and multiple strobes each corresponding to one of said cameras.

13. The system of claim 9 wherein said storage circuit comprises:

a buffer for storing said data representing each image; and a frame grabber for coupling said data from said camera to said buffer.

14. A method for acquiring substantially centered images of items that are moving along a line at a speed and in a direction, comprising:

indicating when an item is substantially a predetermined distance from a camera view;

waiting a delay after said indicating step;

firing a strobe after said delay time;

acquiring an image by activating said camera;

determining a current offset value of said image from said camera view;

calculating an average offset value using said current offset value;

updating said delay using said average offset value;

storing said current offset value, said delay, and said average offset value; and repeating each of said steps for each next item.

15. The method of claim 14 wherein said step of updating comprises:

generating an offset delay value equal to the quotient of said average offset value divided by said speed; and adding said offset delay value to said delay.

16. The method of claim 14 wherein said step of determining comprises determining said current offset value in substantially said direction.

17. The method of claim 14 wherein said step of updating comprises:

storing a speed value approximately equal to said speed;

generating an offset delay value equal to the quotient of said average offset value divided by said speed value; and adding said offset delay value to said delay.

18. The method of claim 14 wherein said step of calculating comprises:

calculating said average offset value over a consecutive number of said images;

generating the product of said average offset value and said number;

subtracting from said product the oldest offset to generate a first value;

generating the sum of said first value and said current offset value;

generating the quotient of the sum divided by said number; and setting said average offset value equal to the quotient.

19. The method of claim 14 further comprising initially generating said delay equal to the quotient of said predetermined distance divided by said speed.

20. The method of claim 14 further comprising storing an initial delay value as said delay.

* * * * *